(12) United States Patent
Noguchi (10) Patent No.: US 10,751,841 B2
(45) Date of Patent: Aug. 25, 2020

(54) BONDING MATERIAL, AND BONDING METHOD AND BONDED STRUCTURE EACH USING SAME

(71) Applicant: Murata Manufacturing Co., Ltd., Nagaokakyo-shi, Kyoto-fu (JP)

(72) Inventor: Masumi Noguchi, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 161 days.

(21) Appl. No.: 16/015,279

(22) Filed: Jun. 22, 2018

(65) Prior Publication Data

US 2018/0297152 A1 Oct. 18, 2018

Related U.S. Application Data

(63) Continuation of application No. PCT/JP2017/000071, filed on Jan. 5, 2017.

(30) Foreign Application Priority Data

Feb. 1, 2016 (JP) ................................. 2016-017211

(51) Int. Cl.
| | | |
|---|---|---|
| B23K 35/26 | (2006.01) | |
| C22C 13/00 | (2006.01) | |
| B23K 1/19 | (2006.01) | |
| C22C 9/06 | (2006.01) | |
| B23K 35/30 | (2006.01) | |
| B23K 1/00 | (2006.01) | |
| B32B 15/04 | (2006.01) | |

(Continued)

(52) U.S. Cl.
CPC .......... *B23K 35/262* (2013.01); *B23K 1/0016* (2013.01); *B23K 1/19* (2013.01); *B23K 35/007* (2013.01); *B23K 35/0233* (2013.01); *B23K 35/0238* (2013.01); *B23K 35/0244* (2013.01); *B23K 35/302* (2013.01); *B32B 15/04* (2013.01); *C22C 9/06* (2013.01); *C22C 13/00* (2013.01)

(58) Field of Classification Search
None
See application file for complete search history.

(56) References Cited

U.S. PATENT DOCUMENTS

| | | | |
|---|---|---|---|
| 8,471,386 | B2 | 6/2013 | Yamada et al. |
| 9,105,987 | B2 | 8/2015 | Nakano et al. |

(Continued)

FOREIGN PATENT DOCUMENTS

| | | | |
|---|---|---|---|
| JP | 2004174522 A | 6/2004 | |
| JP | 2007019360 A | 1/2007 | |

(Continued)

OTHER PUBLICATIONS

International Search Report issued in International Application No. PCT/JP2017/000071, dated Apr. 11, 2017.

(Continued)

*Primary Examiner* — Daniel J. Schleis
(74) *Attorney, Agent, or Firm* — Arent Fox LLP (57) ABSTRACT

A bonding material having a first layer containing Sn as a main component thereof and a second layer containing a metal having a higher melting point than that of Sn as a main component thereof, wherein the first layer and the second layer are laminated on each other, and an amount of Sn in the first layer is larger than a stoichiometric amount of Sn that forms an intermetallic compound between the Sn and the metal.

7 Claims, 5 Drawing Sheets

(51) Int. Cl.
*B23K 35/00* (2006.01)
*B23K 35/02* (2006.01)

(56) References Cited

U.S. PATENT DOCUMENTS

| | | |
|---|---|---|
| 9,113,571 B2 | 8/2015 | Nakagoshi et al. |
| 9,209,527 B2 | 12/2015 | Nakano et al. |
| 9,426,915 B2 | 8/2016 | Ohashi et al. |
| 9,614,295 B2 | 4/2017 | Nakano et al. |
| 2011/0291282 A1 | 12/2011 | Yamada et al. |
| 2013/0048153 A1 | 2/2013 | Yen et al. |
| 2013/0270001 A1 | 10/2013 | Nakano et al. |
| 2013/0299236 A1 | 11/2013 | Nakano et al. |
| 2013/0343023 A1 | 12/2013 | Nakagoshi et al. |
| 2015/0072165 A1 | 3/2015 | Sunaga et al. |
| 2015/0319876 A1 | 11/2015 | Ohashi et al. |
| 2016/0043480 A1 | 2/2016 | Nakano et al. |

FOREIGN PATENT DOCUMENTS

| | | |
|---|---|---|
| JP | 2010179336 A | 8/2010 |
| JP | 2014007227 A | 1/2014 |
| WO | 2012086745 A1 | 6/2012 |
| WO | 2012108395 A1 | 8/2012 |
| WO | 2013191022 A1 | 12/2013 |
| WO | 2014103955 A1 | 7/2014 |

OTHER PUBLICATIONS

Written Opinion of the International Searching Authority issued in International Application No. PCT/JP2017/000071, dated Apr. 11, 2017.

BONDING MATERIAL, AND BONDING METHOD AND BONDED STRUCTURE EACH USING SAME

CROSS REFERENCE TO RELATED APPLICATIONS

The present application is a continuation of International application No. PCT/JP2017/000071, filed Jan. 5, 2017, which claims priority to Japanese Patent Application No. 2016-017211, filed Feb. 1, 2016, the entire contents of each of which are incorporated herein by reference.

FIELD OF THE INVENTION

The present invention relates to a bonding material for bonding objects to each other; and a bonding method and a bonded structure each using the bonding material.

BACKGROUND OF THE INVENTION

As a bonded article produced by bonding objects to each other, a bonded product is known, which is provided with a solder member composed of an Sn-based solder material and a three-dimensional net-like structure containing Cu as the main component and contained in the Sn-based solder material (see, for example, Patent Document 1). In the bonded product disclosed in Patent Document 1, the three-dimensional net-like structure is bonded to each of bond surfaces of the objects to be bonded using a Cu—Sn alloy.

Patent Document 1: Japanese Patent Application Laid-Open No. 2010-179336

SUMMARY OF THE INVENTION

In the bonded product disclosed in Patent Document 1, however, there is the problem that it is impossible to bond objects to be bonded to each other while improving heat resistance and also improving impact resistance.

The object of the present invention is to provide: a bonding material which can bond objects to be bonded to each other while improving heat resistance and also improving impact resistance; and a bonding method and a bonded structure, in each of which the bonding material is used.

The bonding material according to one aspect of the present invention includes a first layer containing Sn as the main component; and a second layer containing a metal having a higher melting point than that of Sn as the main component, wherein the first layer and the second layer are laminated on each other, and the amount of Sn in the first layer is larger than the stoichiometric amount of Sn that forms an intermetallic compound between Sn and the metal.

The bonding method according to one aspect of the present invention is a bonding method for bonding two objects to each other, and the method includes a step of arranging a bonding material between the two objects to be bonded, wherein the bonding material is produced by laminating a first layer containing Sn as the main component and a second layer containing a metal having a higher melting point than that of Sn as the main component on each other; and a step of forming an intermetallic compound by subjecting the bonding material to a heat treatment at a temperature equal to or higher than the melting point of Sn and lower than the melting point of the metal, wherein the amount of Sn in the bonding material is larger than the stoichiometric amount of Sn that forms the intermetallic compound between Sn and the metal.

The bonded structure according to one aspect of the present invention includes a first bond part which contains an intermetallic compound between Sn and a metal having a higher melting point than that of Sn as the main component; and a second bond part which contains Sn as the main component, wherein the first bond part is formed between two objects to be bonded, and the second bond part is arranged on a part of the surface of the first bond part which is exposed from between the two objects to be bonded.

According to the present invention, it becomes possible to provide a bonding material which can bond objects to each other while improving heat resistance and also improving impact resistance; and a bonding method and a bonded structure, in each of which the bonding material is used.

DETAILED DESCRIPTION OF THE INVENTION

In the bonded product disclosed in Patent Document 1, a Cu—Sn alloy is formed in order to increase the heat resistance of the bonding between the objects to be bonded. The present inventors now find a problem that, when Sn that has a low melting point is melted and is brought into contact with Cu that has a high melting point during the formation of a Cu—Sn alloy, voids are formed in a part where Sn is initially placed, leading to the deterioration in impact resistance. Therefore, the present inventors have arrived at the invention mentioned below and achieve both an improvement in heat resistance and an improvement in impact resistance in bonding between objects to be bonded.

A bonding material according to one embodiment of the present invention includes a first layer containing Sn as a main component thereof; and a second layer containing a metal having a higher melting point than that of Sn as the main component thereof, wherein the first layer and the second layer are laminated on each other, and an amount of Sn in the first layer is larger than a stoichiometric amount of Sn that forms an intermetallic compound between Sn and the metal.

According to this, it becomes possible to bond two objects to each other while improving heat resistance and also improving impact resistance.

In the bonding material, the metal in the second layer may be a CuNi alloy. This further improves heat resistance and impact resistance.

In the bonding material, the intermetallic compound may be $(CuNi)_6Sn_5$, and the amounts of the CuNi alloy and Sn may be 40 wt % and 65 wt % or more, respectively, relative to the sum total, i.e., 100 wt %, of the stoichiometric amount of Sn forming $(CuNi)_6Sn_5$ and the stoichiometric amount of the CuNi alloy. This makes it possible to bond the two objects in such a manner that the periphery of $(CuNi)_6Sn_5$ that is an intermetallic compound formed between the objects to be bonded can be covered with Sn, and therefore improve impact resistance.

In the bonding material, the metal in the second layer may be in the form of a powder. According to this, it is possible to produce the intermetallic compound more smoothly, and therefore heat resistance and impact resistance can be further improved.

In the bonding material, the second layer may be arranged between two of the first layers. With such a structure, it is possible to prevent the formation of voids in a part where Sn is initially placed during the bonding of the two objects to each other, and therefore heat resistance can be improved and impact resistance can also be improved.

In the bonding material, the second layer may contain a flux. This makes it possible to remove oxides, and therefore the bonding of the objects to be bonded to each other can be accelerated.

The bonding material may also be in a sheet-like or tape-like form. Such a configuration improves handling.

The bonding method according one aspect of the present invention includes a step of arranging a bonding material between two objects to be bonded, wherein the bonding material is produced by laminating a first layer containing Sn as a main component thereof and a second layer containing a metal having a higher melting point than that of Sn as main component thereof onto each other; and a step of forming an intermetallic compound by subjecting the bonding material to a heat treatment at a temperature equal to or higher than the melting point of Sn and lower than the melting point of the metal, wherein the amount of Sn in the bonding material is larger than the stoichiometric amount of Sn that forms the intermetallic compound between Sn and the metal.

According to this method, it is possible to bond the two objects to each other while improving heat resistance and also improving impact resistance.

In the bonding method, the metal in the second layer may be a CuNi alloy. This makes it possible to further improve heat resistance and impact resistance.

In the bonding method, the intermetallic compound may be $(CuNi)_6Sn_5$, and the amounts of the CuNi alloy and Sn may be 40 wt % and 65 wt % or more, respectively, relative to the sum total, i.e., 100 wt %, of the stoichiometric amount of Sn forming $(CuNi)_6Sn_5$ and the stoichiometric amount of the CuNi alloy. According to this, the periphery of $(CuNi)_6Sn_5$, which is an intermetallic compound formed between the two objects to be bonded, is covered with Sn and therefore impact resistance can be improved.

In the bonding method, the metal in the second layer may be in the form of a powder. This allows the formation of the intermetallic compound to be easily facilitated, and heat resistance and impact resistance can be further improved.

In the bonding method, the second layer may be arranged between two of the first layers. This makes it possible to prevent the formation of voids in a part where Sn is initially placed, and therefore heat resistance can be improved and impact resistance can also be improved.

In the bonding method, the second layer may contain a flux. This allows for the removal of oxides and accelerates the bonding of the objects to each other.

In the bonding method, each of bond surfaces respectively formed in the objects to be bonded may be formed from a metallic surface that contains Cu as the main component. According to this, each of bond surfaces respectively formed in the objects to be bonded can easily contact with the bonding material and therefore the bonding of the objects to each other can be achieved easily.

In the bonding method, the step of forming the intermetallic compound may involve carrying out a heat treatment while pressurizing the bonding material. With such a step, the contact volume decreases in accordance with the pressure to be applied and excess Sn migrates into an exposed part of the surface of an intermetallic compound during the melting of Sn, and therefore the exposed part of the surface of the intermetallic compound can be covered with Sn. As a result, impact resistance can be improved.

The bonded structure according to one aspect of the present invention is a bonded structure formed by bonding two objects to each other with a first bond part which contains an intermetallic compound between Sn and a metal having a higher melting point than that of Sn as the main component thereof; and a second bond part which contains Sn as the main component thereof, wherein the first bond part is located between the two objects to be bonded, and the second bond part is arranged on a part of the surface of the first bond part which is exposed between the two objects to be bonded.

With such a structure, the second bond part containing Sn as the main component is arranged on the surface of the first bond part containing the intermetallic compound as the main component thereof, and therefore the two objects to be bonded can be bonded to each other while improving heat resistance and also improving impact resistance.

In the bonded structure, the second bond part may entirely cover a part of the surface of the first bond part which is exposed between the two objects to be bonded. According to this structure, the second bond part containing Sn as the main component covers an exposed part of the surface of the first bond part containing the intermetallic compound as the main component, and therefore impact resistance can be further improved.

In the bonded structure, the metal may be a CuNi alloy. This makes it possible to further improve heat resistance and impact resistance.

In the bonded structure, the intermetallic compound in the first bond part may be $(CuNi)_6Sn_5$, and third bond parts each containing an intermetallic compound $Cu_3Sn$ as the main component thereof may be respectively provided between the objects to be bonded and the first bond part. With this structure, it is possible to further improve heat resistance and impact resistance.

Hereinbelow, an embodiment of the present invention will be described with reference to the accompanied drawings. In each drawing, each component is overdrawn in order to facilitate the description.

EMBODIMENTS

[Bonding Material]

A bonding material according to one embodiment of the present invention will be described.

Figure 1:
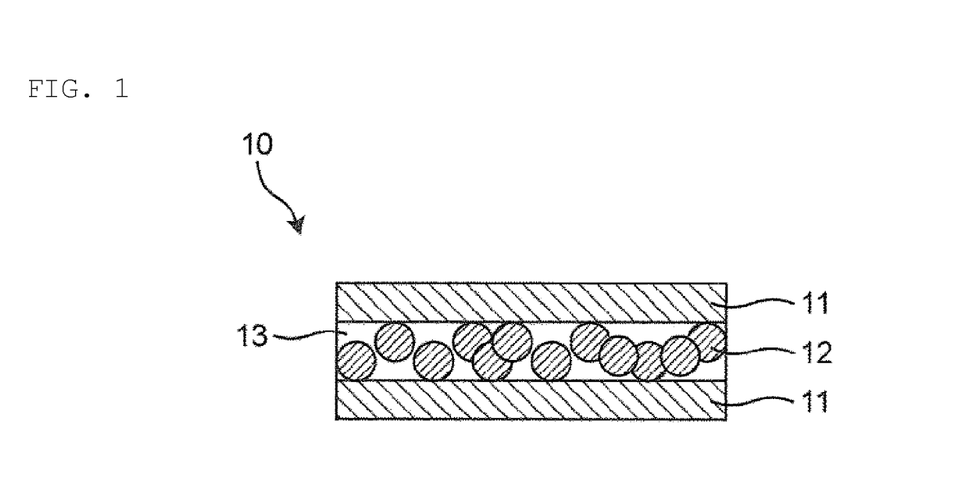
FIG. 1 is a schematic diagram illustrating a bonding material according to one embodiment of the present invention.

FIG. 1 is a schematic diagram illustrating the constitution of a bonding material 10 according to one embodiment of the present invention. As shown in FIG. 1, the bonding material 10 is provided with first layers 11 each containing Sn as the main component and a second layer 12 containing a metal having a higher melting point than that of Sn as the main component. The first layers 11 and the second layer 12 are laminated together, and the second layer 12 is arranged between the two first layers 11 that face each other in such a manner that the second layer 12 contacts with each of the first layers 11. The second layer 12 contains a flux 13.

<First Layers>

The first layers 11 are made from a metal that contains Sn as the main component. Examples of the metal containing Sn as the main component include Sn-0.7Cu, Sn-3.5Ag-0.7Cu and Sn—Sb. The first layers 11 are a metal-made thin film layer that contacts with each of bond surfaces of the objects to be bonded. The thickness of each of the first layers 11 is, for example, 50 to 200 μm inclusive. On a surface of the first layer 11 which is on the side where the first layer 11 contacts with a bond surface of each of the objects to be bonded, an adhesive resin or a flux may be arranged. In this case, the bonding of the first layer to the objects to be bonded can be facilitated.

With respect to the expressions for the above-mentioned metals, for example, the numerical value "3.5" in the expression "Sn-3.5Ag-0.5Cu" refers to the value of the % by weight of the component (Ag in this case), and the numerical value "0.5" refers to the value of the % by weight of the component (Cu in this case).

<Second Layer>

A second layer 12 is a layer which contains a metal having a higher melting point than that of Sn as the main component. Examples of the metal having a higher melting point than that of Sn include a Cu—Ni alloy and a Cu—Mn alloy. The thickness of the second layer 12 is, for example, 10 to 50 μm inclusive. In this embodiment, the second layer 12 is a Cu-10Ni (also referred to as "CuNi alloy", hereinafter) powder layer. The wording "Cu-10Ni" means that Ni is contained in an amount of 10 wt %. The term "powder layer" refers to a layer formed by a material containing a metal powder. The second layer 12 is sandwiched between the two first layers 11 that face each other.

<Flux>

A flux 13 is contained in the second layer 12. The flux can remove an oxide film on the surface of each of the objects to be bonded or the metal. As the flux, any one of various known fluxes including a vehicle, a solvent, a thixotropic agent and an activating agent can be used.

In this embodiment, when the bonding material 10 is subjected to a heat treatment at a temperature equal to or higher than the melting point of Sn, i.e., 231.93° C., Sn in the first layer 11 chemically reacts with the CuNi alloy in the second layer 12 to form an intermetallic compound $(CuNi)_6Sn_5$. The amount of Sn in the first layer 11 is larger than the stoichiometric amount of Sn that forms an intermetallic compound with the CuNi alloy. Concretely, in the bonding material 10, the amounts of the CuNi alloy in the second layer 12 and Sn in each of the first layers 11 are 40 wt % and 65 wt % or more, respectively, relative to the sum total, i.e., 100 wt %, of the stoichiometric amount (60 wt %) of Sn forming the intermetallic compound $(CuNi)_6Sn_5$ and the stoichiometric amount (40 wt %) of the CuNi alloy. In other words, in the bonding material 10, the amount of Sn in each of the first layer 11 is 1.6 times or more larger than the amount of the CuNi alloy in the second layer 12.

The bonding material 10 is formed in a sheet-like or tape-like form from the viewpoint of, for example, handling performance.

The object to be bonded (14a or 14b) may be any one, as long as the object has a bond surface. Examples of the object to be bonded (14a or 14b) include Cu, Ni, Ag and Au, a Cu bus bar which are used in electrodes in electronic components and an Sn-plated steel sheet.

[Bonding Method]

The bonding method using the bonding material 10 according to the embodiment of the present invention will be described.

Figure 2A:
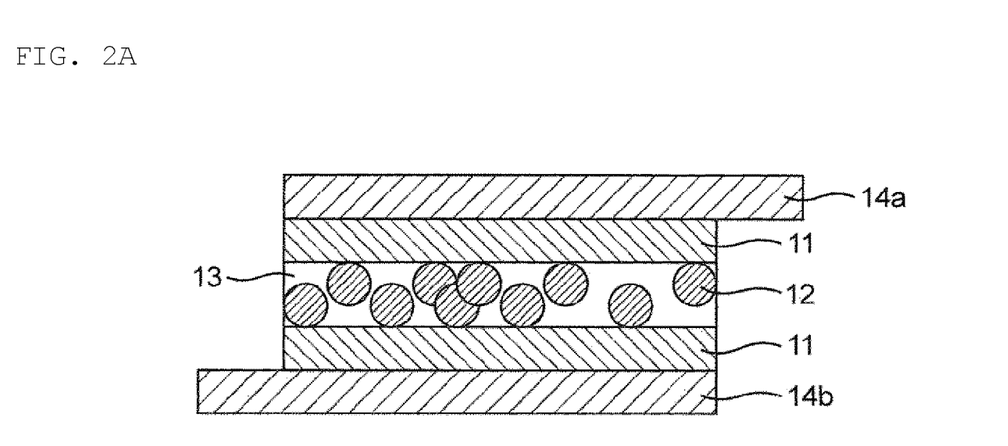
FIG. 2A is a diagram illustrating a bonding method using a bonding material according to one embodiment of the present invention.
Figure 2B:
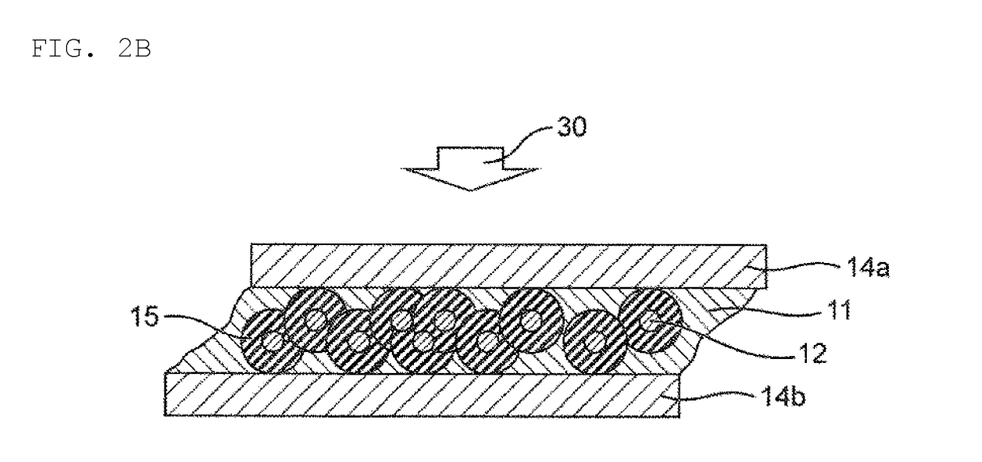
FIG. 2B is a diagram illustrating a bonding method using a bonding material according to one embodiment of the present invention.
Figure 2C:
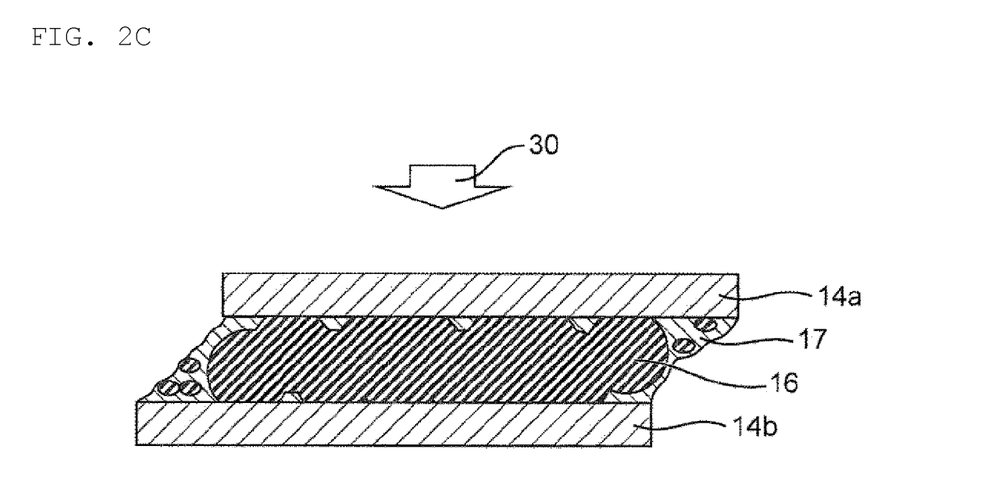
FIG. 2C is a diagram illustrating a bonding method using a bonding material according to one embodiment of the present invention.

FIGS. 2A to 2C illustrate steps of the bonding method using the bonding material 10 according to one embodiment of the present invention.

As shown in FIG. 2A, the bonding material 10 is arranged between the two objects to be bonded 14a and 14b that face each other. The bonding material 10 is sandwiched between the two objects to be bonded 14a and 14b. In this embodiment, the surface of each of the objects to be bonded 14a and 14b which contacts with the bonding material 10 is formed by a metal containing Cu as the main component.

As shown in FIG. 2B, a heat treatment is carried out while pressurizing the bonding material 10 in a direction 30 from the object to be bonded 14a toward the object to be bonded 14b. Concretely, a pressure is applied in a direction 30 in which the upper surface of the object to be bonded 14a can be pressurized with a pressurization jig so that the distance between the two objects to be bonded 14a and 14b that face each other can be minimized. The bonding material 10 is subjected to a heat treatment at a temperature equal to or higher than the melting point of Sn, e.g., 231° C. for pure Sn, and lower than the melting point of Cu, i.e., 1084° C.

As the result of the heat treatment, Sn in the first layers 11 is melted. The molten Sn contacts with the CuNi alloy in the second layer 12 to cause a chemical reaction, resulting in the formation of $(CuNi)_6Sn_5$ which is an intermetallic compound 15 having a melting point of 250° C. or higher. As the result of the formation of the intermetallic compound 15, the volume is reduced to form void spaces in the intermetallic compound 15. The molten Sn flows into the void spaces one by one to prevent the formation of voids. This is because the amount of Sn is larger than the stoichiometric amount of Sn that forms $(CuNi)_6Sn_5$ between Sn and Cu.

In this embodiment, the second layer 12 is sandwiched by two first layers 11. Therefore, the chemical reaction between Sn and CuNi gradually occurs from the outer surface of the second layer 12, i.e., the contact surface between the second layer 12 and each of the first layers 11, toward the center of the second layer 12 as observed in the direction of thickness of the bonding material 10. In other words, $(CuNi)_6Sn_5$, which was the intermetallic compound 15, was formed gradually from the outer surface of the second layer 12 toward the center as observed in the direction of thickness of the bonding material 10. As a result, even when a gas derived from the flux 13 is generated, the gas slips out from the center of the second layer 12 as observed in the direction of extension of the bonding material 10. In this manner, the formation of voids caused by the gas derived from the flux 13 can be prevented.

As shown in FIG. 2C, the chemical reaction between Sn and CuNi further proceeds to form a first bond part 16, which is contains the intermetallic compound 15 $(CuNi)_6Sn_5$ as the main component between the two objects to be bonded 14a and 14b. When a pressure is further applied in the direction 30 after the first bond part 16 is formed, excess Sn migrates into the periphery of $(CuNi)_6Sn_5$. As a result, a second bond part 17 is formed, in which a metal containing Sn as the main component covers exposed parts of the surface of the first bond part 16 at which the objects to be bonded 14a and 14b are bonded to each other.

In the case where each of the bond surfaces of the objects to be bonded 14a and 14b is formed from Cu, Cu in the bond surfaces of the objects to be bonded 14a, 14b chemically reacts with Sn in the first layers 11. As the result of the chemical reaction, third bond parts, each of which contains $Cu_3Sn$ as the main component that is an intermetallic compound between Sn and Cu, are formed respectively between the first bond parts 16 and the objects to be bonded 14a and 14b. The third bond parts can further facilitate the bonding between the objects to be bonded 14a and 14b. The third bond parts will be described later.

[Bonded Structure]

The bonded structure according to one embodiment of the present invention will be described.

Figure 3:
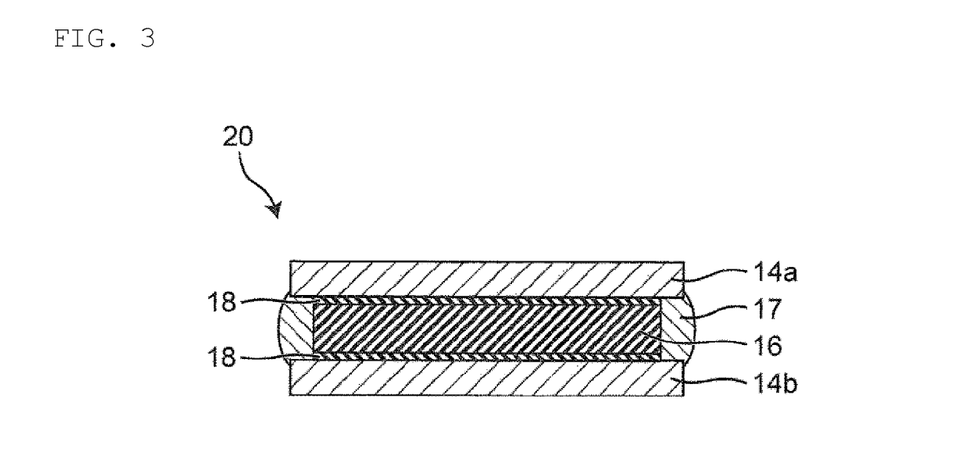
FIG. 3 is a schematic diagram illustrating a bonded structure according to one embodiment of the present invention.

FIG. 3 is a schematic diagram illustrating a bonded structure 20 according to one embodiment of the present invention.

As shown in FIG. 3, the bonded structure 20 is provided with, between two objects to be bonded 14a and 14b, a first bond part 16, a second bond part 17 which covers the periphery of the first bond part 16, and third bond parts 18 which are formed between the first bond part 16 and the objects to be bonded 14a and 14b.

<First Bond Part>

The first bond part 16 is a part that contains $(CuNi)_6Sn_5$, which is an intermetallic compound 15 between Sn and CuNi, as the main component. The first bond part 16 is formed between the two objects to be bonded 14a and 14b that face each other, and bonds the objects to be bonded 14a and 14b to each other. The first bond part 16 may also contain Sn or CuNi, in addition to the main component $(CuNi)_6Sn_5$.

<Second Bond Parts>

The second bond part 17 is a part containing Sn as the main component. The second bond part 17 is arranged on a part the surface of the first bond part 16 which is exposed from between the two objects to be bonded 14a and 14b. The second bond part 17 has higher toughness than that of the first bond part 16. Therefore, when the second bond part 17 is arranged on a part of the surface of the first bond part 16 which is exposed from between the two objects to be bonded 14a and 14b, it becomes possible to improve impact resistance. In this embodiment, the second bond part 17 entirely covers a part of the surface of the first bond part 16 which is exposed from between the two objects to be bonded 14a and 14b. The second bond part 17 may also contain the intermetallic compound 15, in addition to the main component Sn.

<Third Bond Part>

A third bond part 18 is a part which contains $Cu_3Sn$ that is an intermetallic compound between Sn and Cu as the main component. In the case where the bond surface of each of the objects to be bonded 14a and 14b is formed from Cu, the third bond part 18 is formed between each of the objects to be bonded 14a and 14b and the first bond part 16. The third bond part 18 can improve the heat resistance and impact resistance of the bonding between the object to be bonded 14a and the object to be bonded 14b.

Figure 4:
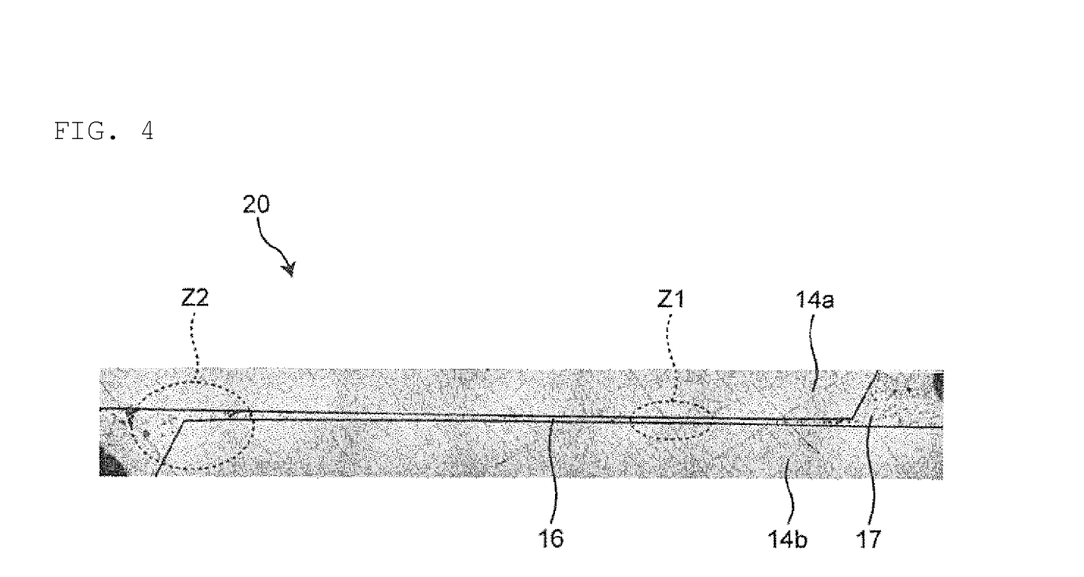
FIG. 4 is a photograph of a bonded structure according to one embodiment of the present invention, which is taken with a SEM (scanning electron microscope).
Figure 5:
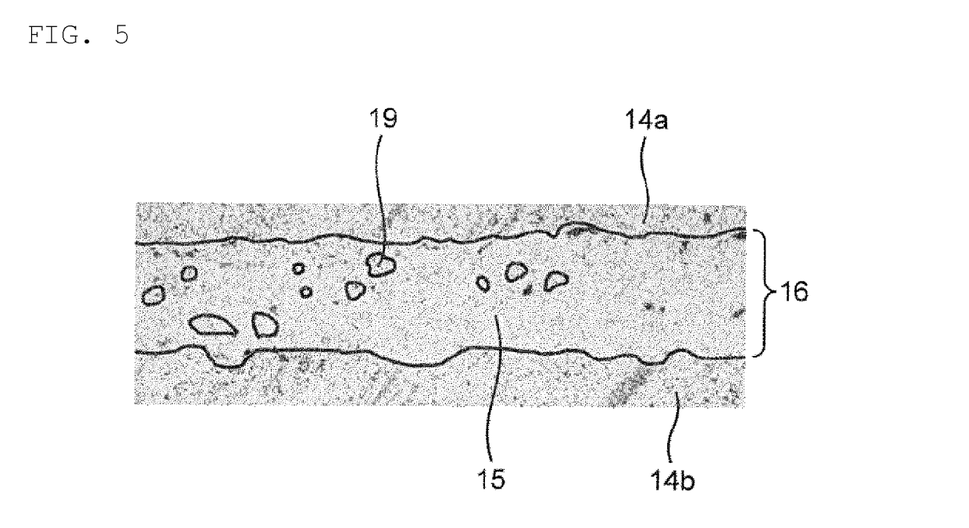
FIG. 5 is an enlarged view of a Z1 part in the bonded structure shown in FIG. 4.

FIG. 4 is a photograph of the bonded structure 20 which is taken by a SEM (scanning electron microscope). FIG. 5 is an enlarged view of a Z1 part in the bonded structure 20 shown in FIG. 4. In FIGS. 4 and 5, black parts correspond to voids. As shown in FIGS. 4 and 5, it is found that, in the first bond part 16 formed between the two objects to be bonded 14a and 14b, black parts are small and therefore the formation of voids is prevented. It is also found that a part of a metal powder 19 of CuNi which cannot chemically react with Sn is contained in the first bond part 16 and the intermetallic compound 15 $(CuNi)_6Sn_5$ makes up the most part of the part.

Figure 6:
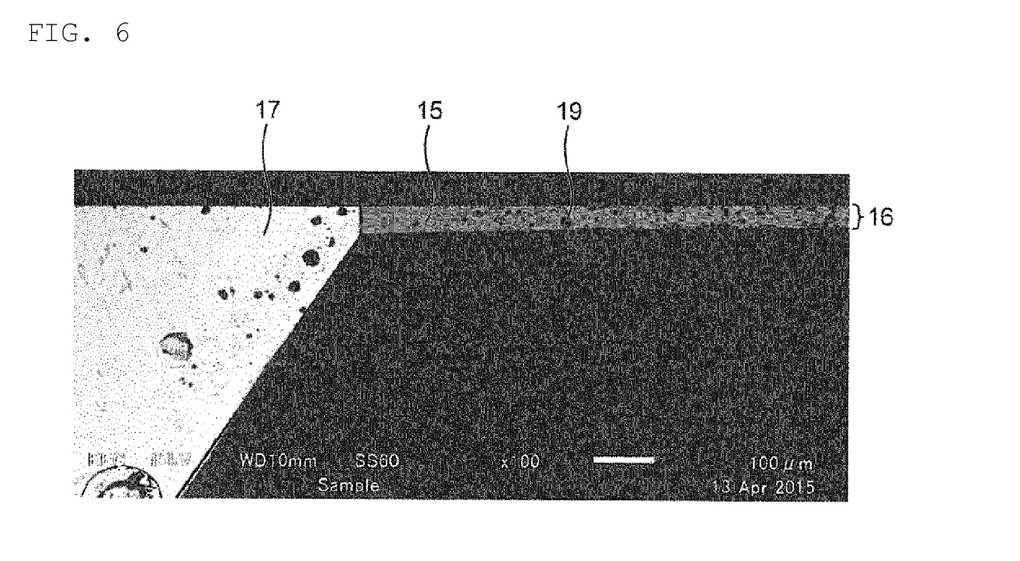
FIG. 6 is a backscattered electron image of a Z2 part in the bonded structure shown in FIG. 4.

FIG. 6 is a backscattered electron image of a Z2 part in the bonded structure 20 shown in FIG. 4. In FIG. 6, a white part corresponds to a second bond part 17 which contains Sn as the main component, a gray part corresponds to a first bond part 16 which contains the intermetallic compound 15 as the main component, and a black part corresponds to a metal powder 19 of CuNi. As shown in FIG. 6, a second bond part 17 is formed in an exposed part of the first bond part 16 formed between the objects to be bonded 14a and 14b that face each other. That is, an exposed surface of $(CuNi)_6Sn_5$ that is the main component of the first bond part 16 is covered with Sn that is the main component of the second bond part 17.

According to the bonding material 10, the bonding method and the bonded structure 20 according to the embodiment of the present invention, the following advantageous effects can be achieved.

The bonding material 10 is provided with a first layer 11 containing Sn as the main component and a second layer 12 containing a CuNi alloy having a higher melting point than that of Sn as the main component, wherein the first layer 11 and the second layer 12 are laminated on each other. The amount of Sn in the first layer 11 is larger than the stoichiometric am of Sn forming $(CuNi)_6Sn_5$ that is an intermetallic compound 15 between Sn and CuNi in the second layer 12. In the bonding method using the bonding material 10, the bonding material 10 is arranged between the two objects to be bonded 14a and 14b and subjected to a heat treatment to form $(CuNi)_6Sn_5$ that is an intermetallic compound 15 between Sn and CuNi. In the bonding method, it becomes possible for 12 to form an intermetallic compound 15 having a higher melting point than that of Sn in a bonding part at which the two objects to be bonded 14a and 14b are bonded to each other through the diffusion reaction between Sn and CuNi. The intermetallic compound 15 can bond the two objects to be bonded 14a and 14b to each other while improving heat resistance. In addition, the amount of Sn in the first layer 11 is larger than the stoichiometric amount of Sn forming the intermetallic compound 15, and therefore excess molten Sn flows into void spaces formed as the result of the generation of the intermetallic compound 15. In this manner, the formation of voids can be prevented and the impact resistance of the bonding can be improved.

In the bonding method, an exposed part of the surface of the intermetallic compound 15 can be covered with excess Sn which fails to chemically react with the CuNi alloy by pressuring the bonding material 10. Sn has higher toughness than the intermetallic compound 15, and therefore it becomes possible to protect the intermetallic compound 15. As a result, the two objects to be bonded 14a and 14b can be bonded to each other while improving impact resistance.

In the bonding method, in the case where each of the bond surfaces in the two objects to be bonded 14a and 14b is formed from Cu, a chemical reaction between Sn in the first layer 11 and Cu in the bond surfaces occurs by the heat treatment to form $Cu_3Sn$ that is an intermetallic compound. The formation of $Cu_3Sn$ enables the further improvement in heat resistance and impact resistance of the bonding between the two objects to be bonded 14a and 14b.

In the bonding material 10, when the second layer 12 is a metal powder layer of a CuNi alloy, the formation of the intermetallic compound 15 can be facilitated and heat resistance and impact resistance can be further improved.

In the bonding material 10, the second layer 12 is arranged between two first layers 11. Therefore, the chemical reaction between Sn and CuNi gradually occurs from the contact surfaces between the first layers 11 and the second layer 12 toward the center of the second layer 12, as observed in the direction of thickness of the bonding material 10. As a result, a gas derived from the flux 13, which is generated through the heat treatment, slips out from the center of the second layer 12 as observed in the direction of extension of the bonding material 10. As a result, the formation of voids caused by the gas derived from the flux 13 can be prevented.

When the bonding material 10 is formed into a sheet-like or tape-like form, handling performance can be improved.

The bonded structure 20 can be produced by the bonding method using the bonding material 10. The bonded structure 20 is provided with: a first bond part 16 which is formed between two objects to be bonded 14a and 14b and contains $(CuNi)_6Sn_5$ that is an intermetallic compound 15 as the main component; and a second bond part 17 which covers an exposed part of the surface of the first bond part 16 and contains Sn as the main component. According to this constitution, it becomes possible to improve the heat resistance and impact resistance of the bonding between the two objects to be bonded 14a and 14b to each other.

In the bonded structure 20, when third bond parts 18 each containing $Cu_3Sn$ as the main component are provided respectively between the objects to be bonded 14a and 14b and the first bond part 16, the heat resistance and impact resistance can be further improved.

In the embodiment, a metal powder layer made from a CuNi alloy is described as the second layer 12. However, the second layer 12 is not limited to the metal powder layer. The second layer 12 may be, for example, a metal plate layer made from a CuNi alloy. When the second layer 12 is the metal plate layer, it becomes possible to laminate the first layer 11 and the second layer 12 easily. The material for the second layer 12 is not limited to a CuNi alloy, and may be any metal as long as the metal has a higher melting point than that of Sn and an intermetallic compound between the metal and Sn can be formed.

The CuNi alloy may contain at least Cu and Ni. For example, like a Cu—Ni—Co alloy, the CuNi alloy may contain a metal other than Cu or Ni (Co in this case).

In the bonding method according to this embodiment, an example in which an intermetallic compound is formed by carrying out a heat treatment while pressurizing with a pressurization jig is described. However, the bonding method is not limited to this example. For example, the bonding method may be carried out in such a manner that the distance between the objects to be bonded 14a and 14b may be reduced under the weight of the objects to be bonded 14a itself. Like this case, it is also possible to bond the objects to be bonded 14a and 14b only by carrying out a heat treatment without the need to use a pressurization jig.

In this embodiment, the bonded structure 20 in which third bond parts 18 each containing $Cn_3Sn$ as the main component are provided respectively between the objects to be bonded 14a and 14b and the first layer 11 is described. However, the bonded structure is not limited to the bonded structure of this type. The bonded structure 20 may not be provided with the third bond parts 18. In this case, cost required for the formation of the third bond parts 18, such as cost required for the formation of the bond surfaces of the objects to be bonded 14a and 14b using Cu, can be reduced.

Figure 7:
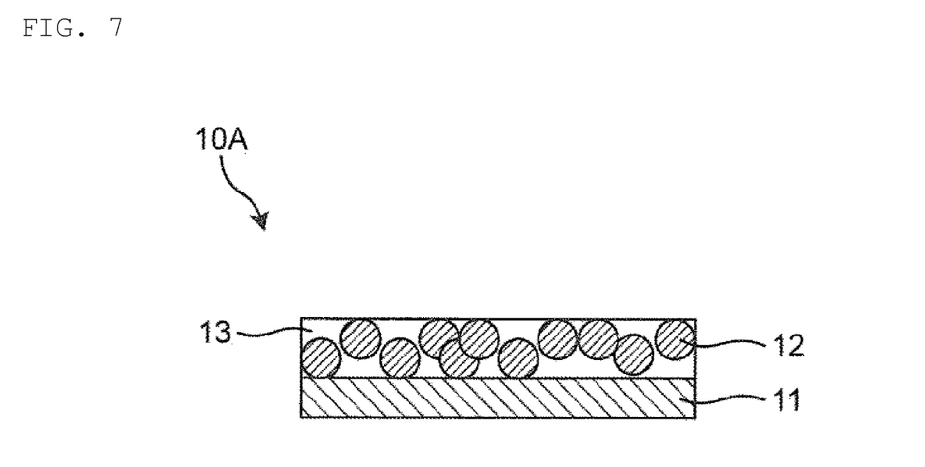
FIG. 7 is a schematic diagram illustrating a variant of a bonding material according to one embodiment of the present invention.

In this embodiment, the constitution in which the second layer 12 is arranged between the two first layers 11 is described. However, the constitution is not limited to the constitution of this type. FIG. 7 shows a bonding material 10A which is a variation of the bonding material according to the embodiment. As shown in FIG. 7, the bonding material 10A is provided with one first layer 11 and one second layer 12, wherein the second layer 12 is laminated on the first layer 11. Like this constitution, the first layer 11 may be in contact with one surface of the second layer 12. According to this constitution, it becomes possible to produce the bonding material 10A easily.

Hereinbelow, examples will be described.

Example 1

In Example 1, the evaluation of impact resistance was carried out by varying the amount of Sn in a first layer 11.

In the evaluation of impact resistance, the sum total of the stoichiometric amount (60 wt %) of Sn forming $(CuNi)_6Sn_5$ that was an intermetallic compound 15 between Sn and CuNi and the stoichiometric amount (40 wt %) of CuNi was defined as 100 wt %. In Example 1, the amount of CuNi in a bonding material 10 was fixed to 40 wt % and the amount of Sn was varied to 65 wt %, 70 wt %, 75 wt %, 100 wt % and 200 wt %. In other words, in Example 1, when the stoichiometric amount of Sn was 1.5 times larger than the amount of Cu, the amount of Sn was varied to 1.6 times, 1.7 times, 1.8 times, 2.5 times and 5 times larger than the amount of Cu.

The method for producing a bonding material 10 of Example 1 is described.

A paste containing a CuNi powder having particle diameters of 5 μm and a flux was printed on an Sn foil (manufactured by The Nilaco Corporation) having any one of various thicknesses ranging from 50 μm to 200 μm inclusive at an application thickness of 20 μm with a doctor blade, and then the paste was dried. Subsequently, the Sn foil having the paste applied thereon was cut into 5-mm square pieces, and then another Sn foil was arranged on the paste.

A bonding method using the bonding material 10 of Example 1 is described.

The bonding material 10 was sandwiched between two Cu plates each having a size of 5 mm length×50 mm wide×2 mm thick. This structure was composed of the Cu plate, the Sn foil, the CuNi paste, the Sn foil and the Cu plate as observed from the bottom. A pressure of 10 MPa was applied onto the Cu plates between which the bonding material 10 was sandwiched with a pressurization jig. The Cu plates having the bonding material 10 intercalated therebetween were heated on a hot plate to 270° C. while applying the pressure. The temperature rising rate was about 100° C./min and the retention time was 2 min. The Cu plates having the bonding material 10 intercalated therebetween were heated under these conditions while applying the pressure, and then the resultant product was removed from the hot plate and then air-cooled.

The evaluation of impact resistance is described.

Impact resistance was evaluated by carrying out a drop test using various Cu plates bonded which were bonded using the bonding material 10 of Example 1. The drop test was carried out in such a manner that the bonded Cu plates dropped from a height of 20 cm and determining whether or not the Cu plates were delaminated. Namely, it was confirmed whether or not the bonding between the Cu plates was broken by the impact of the dropping of the Cu plates. The evaluation of the impact resistance was carried out by carrying out the drop test 20 rounds and calculating a failure rate. The term "failure rate" refers to a rate of the failure of the bonding of the Cu plates in the drop test. The results of the evaluation of impact resistance are shown in Table 1.

TABLE 1

| | CuNi(wt %) | Sn(wt %) | Failure rate (%) |
|---|---|---|---|
| Comparative Example | 40 | 60 | 100 |
| Example 1 | 40 | 60 | 25 |
| | 40 | 70 | 20 |
| | 40 | 75 | 15 |
| | 40 | 100 | 0 |
| | 40 | 200 | 0 |

In Table 1, Comparative Example had a bonded structure 20 in which Cu plates were bonded to each other using a bonding material 10 containing Sn in an amount of 60 wt % that was the stoichiometric amount of Sn forming the intermetallic compound 15. Example 1 had a bonded structure 20 in which Cu plates were bonded to each other using a bonding material 10 containing Sn in an amount larger than the stoichiometric amount of Sn forming the intermetallic compound 15, as mentioned above. Concretely, in Example 1, the amount of CuNi was 40 wt %, while the amount of Sn was varied to 65 wt %, 70 wt %, 75 wt %, 100 wt % and 200 wt %.

As shown in Table 1, in Comparative Example 1, the failure rate in the drop test was 100%. In contrast, in Example 1, the failure rates determined in the Sn amounts of 65 wt %, 70 wt %, and 75 wt % were 25%, 20% and 15%, respectively. When the amounts of Sn were 100 wt % and 200 wt %, each of the failure rates was 0%.

In Example 1, it is considered that, when the amount of Sn was 65 wt %, 70 wt % or 75 wt %, an exposed part of the surface of the intermetallic compound 15 was partially covered with Sn. Therefore, it is considered that a part of the intermetallic compound 15 was exposed without being covered with Sn and was broken by the impact of dropping. On the other hand, in Example 1, it is considered that, when the amount of Sn was 100 wt % or 200 wt %, an exposed part of the surface of the intermetallic compound 15 was entirely covered with Sn. Therefore, it is considered that the periphery of the intermetallic compound 15 can be protected by Sn completely.

As mentioned above, in Example 1, the failure rate decreased with the increase in the amount of Sn relative to the amount of CuNi. Therefore, in the bonding material 10, it is preferred that the amount of CuNi is 40 wt % and the amount of Sn is 65 wt % or more. It is more preferred that the amount of CuNi is 40 wt % and the amount of Sn is 65 to 200 wt % inclusive. In other words, it is preferred that the amount of Sn is 1.6 times or more larger than the amount of CuNi. It is more preferred that the amount of Sn is 1.6 times to 5 times inclusive larger than the amount of CuNi.

Example 2

In Example 2, the evaluation of heat-resistant bondability was carried out while varying the content of Ni in CuNi in a second layer 12.

In Example 2, the content of Ni in CuNi in a second layer 12 was varied to 3 wt %, 4 wt %, 5 wt %, 10 wt %, 20 wt %, 30 wt %, and 40 wt %.

The bonding method using a bonding material 10 of Example 2 was the same as the bonding method in Example 1. Therefore, the description about the bonding method is elided.

The evaluation of heat-resistant bondability is described.

Heat-resistant bondability was evaluated by confirming whether or not one of Cu plates bonded by the above-mentioned method was detached when the Cu plate was lifted up. In the evaluation, the amount of CuNi was 40 wt % and the amount of Sn was 60 wt %. The results of the heat-resistant bondability are shown in Table 2.

TABLE 2

| Ni(wt %) | Heat-resistant bondability |
|---|---|
| 3 | x |
| 4 | x |
| 5 | o |
| 10 | o |
| 20 | o |
| 30 | o |
| 40 | x |

As shown in Table 2, in Example 2, when the content of Ni in CuNi was 3 wt %, 4 wt % or 40 wt %, one of the Cu plates was detached upon lifting up of the Cu plate. It is considered that this is because the content of Ni was too small or too large and therefore the formation of $(CuNi)_6Sn_5$ that is an intermetallic compound 15 between Sn and CuNi was failed. On the other hand, in Example 2, when the content of Ni in CuNi was 5 wt %, 10 wt %, 20 wt % or 30 wt %, the detachment of the Cu plate did not occur.

As mentioned above, when the content of Ni in CuNi is 5 to 30 wt %, $(CuNi)_6Sn_5$ that is an intermetallic compound 15 between Sn and CuNi can be formed, and therefore heat-resistant bondability can be improved.

Example 3

In Example 3, a bonding method using a bonding material 10 in which the first layer 11 was formed from a Sn paste and the second layer 12a was formed from a Cu-2Ni-4Co foil is described.

The bonding material 10 of Example 3 was formed by applying about 40 mg of a solder paste of SN100C (manufactured by Nihon Superior Co., Ltd.) (Sn paste) on each of the main surfaces of a Cu-2Ni-4Co foil having a thickness of 200 μm.

A bonding method using the bonding material 10 of Example 3 is described.

The bonding material 10 was intercalated between two cubes 2 mm on a side, which served as objects to be bonded 14a and 14b. This structure was composed of the Cu cube, the Sn paste, the Cu-2Ni-4Co foil, the Sn paste and the Cu cube as observed from the bottom. The Cu cubes having the bonding material 10B intercalated therebetween were heated on a hot plate at 260° C. for 3 seconds, and then the heated product was subjected to diffusion bonding using a pulse heat unit (manufactured by Nippon Avionics Co., Ltd.). The conditions for the diffusion bonding were as follows: temperature 300° C., pressurizing force 10 MPa, and bonding time 5 min. The temperature rising time was 50 seconds.

The bonded structure 20A of the bonded product that was bonded by the bonding method using the bonding material 10 of Example 3 is described with reference to FIG. 8.

Figure 8:
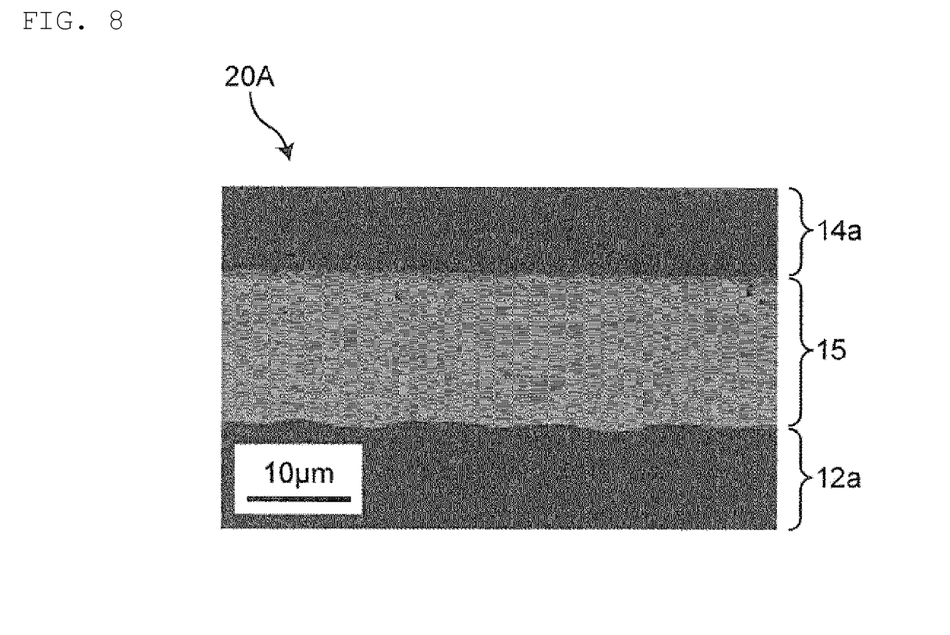
FIG. 8 is a schematic diagram illustrating a bonded structure of a bonded product that is bonded by a bonding method using the bonding material of Example 3.

FIG. 8 is a photograph of a part of the bonded structure 20A of the bonded product bonded by the bonding method using the bonded material 10 of Example 3, which is taken by a SEM (scanning electron microscope). The photograph shown in FIG. 8 was a backscattered electron image taken at an accelerating voltage of 5 kV using a field-emission electron microscope (FE-SEM, S-4800) manufactured by Hitachi High-Technologies Corporation. As shown in FIG. 8, in the bonded structure 20A, a part of the Cu-2Ni-4Co foil that served as a second layer 12a remained between the two objects to be bonded 14a and 14b. In the bonded structure 20A, an intermetallic compound 15 was formed between the Cu cube that served as an object to be bonded 14a and Cu-2Ni-4Co. Although not shown, the intermetallic compound 15 was also formed between the Cu cube that served as the object to be bonded 14b and Cu-2Ni-4Co. That is, the bonded structure 20A was composed of the Cu cube that served as the object to be bonded 14a, the intermetallic compound 15, the Cu-2Ni-4Co foil that served as the second layer 12a, the intermetallic compound 15 and the Cu cube that served as the object to be bonded 14b as observed from the bottom.

As shown in FIG. 8, in the bonded structure 20A, the intermetallic compound 15, which was formed between the Cu cube that served as the object to be bonded 14a and Cu-2Ni-4Co that served as the second layer 12a, had a structure in which little voids were formed on the boundaries therebetween.

The present invention has been fully described in connection with the preferred embodiments thereof with reference to the accompanying drawings. However, various changes or modifications are obvious to those skilled in the art. It is to be understood that such variations or modifications are included within the scope of the invention without departing from the scope of the invention defined by the appended claims.

The present invention is useful in the fields of, for example, the installation of electronic components, the bonding of wiring lines, the bonding of copper pipes and hobbies.

DESCRIPTION OF REFERENCE SYMBOLS

10, 10A: bonding material
11: first layer
12, 12a: second layer
13: flux
14a, 14b: object to be bonded
15: intermetallic compound
16: first bond part
17: second bond part
18: third bond part
19: metal powder
20, 20A: bonded structure
30: direction

The invention claimed is:

1. A bonding material for bonding two objects to each other, the bonding material comprising:
a first layer containing a first metal, and the first metal is a material that contains Sn as a most abundant element by weight %; and
a second layer containing a second metal, the second metal has a material having a higher melting point than that of Sn as a most abundant material by weight % of the second metal,
wherein the first layer and the second layer are laminated on each other, and an amount of Sn in the first layer is larger than a stoichiometric amount of Sn that forms an intermetallic compound between the Sn in the first layer and the second metal in the second layer.

2. The bonding material according to claim 1, wherein the second metal in the second layer is a CuNi alloy.

3. The bonding material according to claim 2, wherein the intermetallic compound is $(CuNi)_6Sn_5$, and the amount of the CuNi alloy is 40 wt % and the amount of the Sn is 65 wt % or more, respectively, relative to a sum total of the stoichiometric amount of Sn and a stoichiometric amount of the CuNi alloy needed to form the intermetallic compound.

4. The bonding material according to claim 1, wherein the second metal in the second layer is in a powder form.

5. The bonding material according to claim 1, wherein the second layer is arranged between two of the first layers.

6. The bonding material according to claim 1, wherein the second layer contains a flux.

7. The bonding material according to claim 1, wherein the bonding material is in the form of a sheet or tape.

* * * * *